Patented Jan. 11, 1944

2,339,061

UNITED STATES PATENT OFFICE 2,339,061

REACTION PRODUCT OF ALDEHYDES AND POLY-(DIAZINYL HYDRAZINO) DERIVATIVES OF POLYCARBOXYLIC ACIDS

Gaetano F. D'Alelio and James W. Underwood, Pittsfield, Mass., assignors to General Electric Company, a corporation of New York No Drawing. Application October 12, 1942, Serial No. 461,768

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a compound corresponding to the following general formula:

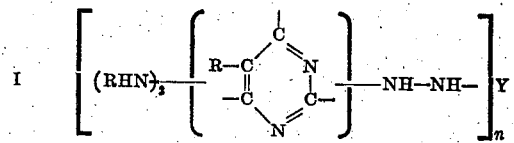

In the above formula R represents a member of the class consisting of hydrogen and monovalent hydrocarbon and substituted hydrocarbon radicals, more particularly halo-hydrocarbon radicals. Y represents a polyacyl radical of a polycarboxylic acid, more particularly an aliphatic or an aromatic polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y. Instead of the 1,3-diazinyl or pyrimidyl derivatives represented by the above formula, corresponding derivatives of the 1,2- or ortho-diazines (pyridazines) or of the 1,4- or para-diazines (pyrazines) may be employed.

This application is a continuation-in-part of our copending application Serial No. 456,263, filed August 26, 1942, and assigned to the same assignee as the present invention.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc. Preferably R in Formula I is hydrogen, in which case the compounds may be represented by the general formula:

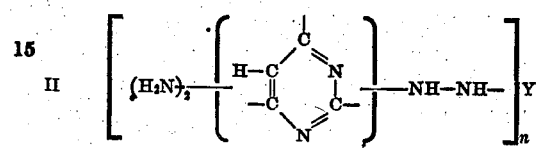

Illustrative examples of polyacyl radicals that Y in Formulas I and II may represent are: aliphatic polyacyl (e. g., oxalyl, malonyl, succinyl, glutaryl, adipyl, tricarballylyl, etc.), including unsaturated aliphatic polyacyl (e. g., maleyl, fumaryl, glutaconyl, itaconyl, citraconyl, mesaconyl, glutinyl, aconityl, muconyl, etc.); and aromatic polyacyl (e. g., phthalyl, naphthalyl, trimethyl, chlorophthalyl, bromophthalyl, isophthalyl, terephthalyl, etc.). Preferably Y is a succinyl or a phthalyl radical, although it also advantageously may be an oxalyl or a malonyl radical.

The poly-(diazinyl hydrazino) derivatives of polycarboxylic acids that are used in carrying the present invention into effect are more fully described and are specifically claimed in our parent copending application Serial No. 456,263. As pointed out in this copending application, a method of preparing the diazine derivatives used in practicing the present invention comprises effecting reaction in the presence of a hydrohalide acceptor, preferably a tertiary base, e. g., a tertiary amine such as a trialkyl or triaryl amine, between (1) a diazine derivative corresponding to the general formula

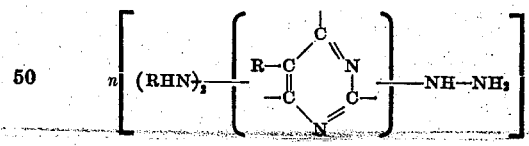

and (2) an acyl halide corresponding to the general formula $YX_n$, where X represents a halogen atom, and $n$, Y and R have the same meanings as given above with reference to Formula I, each halogen represented by X being linked directly to a carbon atom of a carbonyl group of the polyacyl radical represented by Y.

Examples of diazine derivatives embraced by Formula I that may be used in producing our new condensation products are listed below:

Bis - [2,6-di-(methylamino) pyrimidyl-4 hydrazinocarbonyl], which also may be named bis-[2,4-di-(methylamino) pyrimidyl-6 hydrazinocarbonyl] or oxalyl bis - [2,6-di-(methylamino) pyrimidyl-4 hydrazide]
Bis - [2,6-di-(methylamino) pyrimidyl-4 hydrazinocarbonyl]
Bis - [2,6-di-(methylamino) pyrimidyl-4 hydrazinocarbonyl] benzenes
Bis - [4,6-di-(methylamino) pyrimidyl-2 hydrazinocarbonyl]
Bis-[4,6-di-(methylamino) pyrimidyl-2 hydrazinocarbonyl] methane
Bis - (2,6-diamino pyrimidyl-4 hydrazinocarbonyl)
Bis - (4,6-diamino pyrimidyl-2 hydrazinocarbonyl) methane
Alpha,beta,gamma - tri-[2,6 - di-(methylamino) pyrimidyl-4 hydrazinocarbonyl] propane
Bis - (4,6-diamino pyrimidyl-2 hydrazinocarbonyl) benzenes
Bis - (2,6-diamino pyrimidyl-4 hydrazinocarbonyl) benzenes
Alpha,beta-bis-(4,6-diamino pyrimidyl-2 hydrazinocarbonyl) ethane
Alpha,beta-bis-(2,6-diamino pyrimidyl-4 hydrazinocarbonyl) ethane
Bis - [2,6-di-(chloromethylamino) 5-ethyl pyrimidyl-4 hydrazinocarbonyl]
Bis-[4,6-di-(bromoanilino) pyrimidyl-2 hydrazinocarbonyl] methane
Alpha,beta - bis-[4,6-di-(methylamino) pyrimidyl-2 hydrazinocarbonyl] ethane
Alpha,beta - bis - [4,6-di-(ethylamino) pyrimidyl-2 hydrazinocarbonyl] ethane
Alpha,beta-bis-[4,6-di-(propenylamino) pyrimidyl-2 hydrazinocarbonyl] ethane
Alpha,beta - bis-[4,6-di-(cyclohexylamino) pyrimidyl-2 hydrazinocarbonyl] ethane
Alpha,beta-bis - (2,6-dianilino pyrimidyl-4 hydrazinocarbonyl) ethane
Bis - [2,6-di-(allylamino) 5-phenyl pyrimidyl-4 hydrazinocarbonyl] methane
Alpha,beta - bis - [2,6-di-(fluoroanilino) pyrimidyl-4 hydrazinocarbonyl] ethane
Alpha,beta - bis - (2,6-ditoluido pyrimidyl-4 hydrazinocarbonyl] ethane
Alpha,beta - bis-(2,6-dixylidino pyrimidyl-4 hydrazinocarbonyl) ethane
Alpha,beta - bis - [2,6-di-(benzylamino) pyrimidyl-4 hydrazinocarbonyl] ethane
Alpha,beta - bis - [2,6-di-(ethylanilino) pyrimidyl-4 hydrazinocarbonyl] ethane
Alpha,gamma-bis-(4,6-diamino pyrimidyl-2 hydrazinocarbonyl) propane
Alpha,omega - bis-(4,6-diamino 5-ethyl pyrimidyl-2 hydrazinocarbonyl) butane
Alpha,beta-bis-(4,6-diamino pyrimidyl-2 hydrazinocarbonyl) propene
Alpha,beta-bis-(4,6-diamino pyrimidyl-2 hydrazinocarbonyl) ethene
Alpha,beta-bis-(4-methylamino 6-amino pyrimidyl-2 hydrazinocarbohyl) ethane
Alpha,beta-bis-(4-anilino 6-amino pyrimidyl-2 hydrazinocarbonyl) ethane
Alpha,beta - bis - (4-anilino 6-methylamino pyrimidyl-2 hydrazinocarbonyl) ethane
Alpha,beta - bis-[2,6-di-(methylamino) 5 - tolyl pyrimidyl-4 hydrazinocarbonyl] ethane
Bis - [4,6-di-(methylamino) pyrimidyl-2 hydrazinocarbonyl] benzenes
Bis-(4,6-dianilino 5-phenyl pyrimidyl-2 hydrazinocarbonyl) benzenes
Bis - (4,6 - diamino pyrimidyl-2 hydrazinocarbonyl) toluenes
Bis - (4,6 - diamino pyrimidyl-2 hydrazinocarbonyl) xylenes
Bis - (4,6 - diamino pyrimidyl-2 hydrazinocarbonyl) naphthalenes
Bis - [4,6 - di-(iodoanilino) pyrimidyl-2 hydrazinocarbonyl] benzenes
Alpha,beta-bis-[2,6-di-(ethylamino) 5-xenyl pyrimidyl-4 hydrazinocarbonyl] ethane
Bis-[4,6-di-(bromotoluido) pyrimidyl-2 hydrazinocarbonyl] methane
Alpha,omega - bis-(2-cyclohexylamino 5-chloroethyl 6 - anilino pyrimidyl - 4 hydrazinocarbonyl) phenylbutane
Alpha,beta,gamma-tri-(4,6-diamino pyrimidyl-2 hydrazinocarbonyl) propane
1,3,5-tri-(4',6'-diamino pyrimidyl-2' hydrazinocarbonyl) benzenes
Bis - (4,6 - diamino pyrimidyl-2 hydrazinocarbonyl) chlorobenzenes
Bis-[4,6-di-(cyclohexylamino) 5-cyclohexyl pyrimidyl-2 hydrazinocarbonyl] ethanes
Bis - [2,6-di-(octylamino) pyrimidyl-4 hydrazinocarbonyl] propanes
Bis - [4,6-di-(fluoroanilino) pyrimidyl-2 hydrazinocarbonyl] butanes
Bis - [2,6-di-(iodotoluido) 5-xenyl pyrimidyl-4 hydrazinocarbonyl] isopentanes
Bis-[4,6-di-(bromoanilino) pyrimidyl-2 hydrazinocarbonyl] heptanes
Bis - (2,6' - diamino pyrimidyl-4 hydrazinocarbonyl) chloropropanes
Bis-[2,6-di-(chlorotoluido) pyrimidyl-4 hydrazinocarbonyl] benzenes
Bis-[4,6-di-(cyclohexenylamino) 5-allyl pyrimidyl-2 hydrazinocarbonyl] naphthalenes
Bis-[2,6-di-(pentylamino) 5-methyl pyrimidyl-4 hydrazinocarbonyl] chloronaphthalenes
Bis - [4,6-di-(xenylamino) pyrimidyl-2 hydrazinocarbonyl] xylenes
Bis - [2,6-di-(naphthylamino) pyrimidyl-4 hydrazinocarbonyl] ethylbenzenes
Bis-[4,6-di-(chloroethylamino) 5-tolyl pyrimidyl-2 hydrazinocarbonyl] toluenes
Bis-[2,6-di-(butylamino) 5-butyl pyrimidyl-4 hydrazinocarbonyl] propanes
Bis-[4,6-di-(bromopropylamino) 5-octyl pyrimidyl-2 hydrazinocarbonyl] butanes It will be noted that in the above list of compounds embraced by Formula I there are included both poly-(diamino pyrimidyl hydrazinocarbonyl)-substituted aliphatic hydrocarbons, more particularly bis-(diamino pyrimidyl hydrazinocarbonyl) alkanes and alkenes, and poly-(diamino pyrimidyl hydrazinocarbonyl)-substituted aromatic hydrocarbons.

The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a diazine derivative of the kind embraced by Formula I, numerous examples of which have been given above and in our parent copending application Serial No. 456,263. Due to the numerous reactive positions in the diazine derivatives employed in practicing our invention, cured resinous aldehyde-reaction products prepared therefrom are outstanding in their resistance to water and organic solvents. The gloss and general appearance of molded articles made from molding compounds containing these new resins in heat-convertible state also are exceptionally good. Other improved properties, including improved plasticity combined with rapid-curing characteristics and, also, high resistance to heat and abrasion in the cured state, make the products of the present invention suitable for use in fields of utility, for instance in electrically insulating applications, for which resinous materials of lesser resistance to heat, water, abrasion and organic solvents would be wholly unsuited.

It has been suggested heretofore that resinous materials be prepared by condensing an aliphatic aldehyde containing a chain of at the most four carbon atoms with compounds of the general formula III 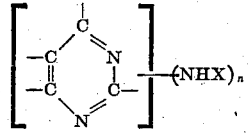

where $n$ represents an integer and is at least 2, X represents a member of the group consisting of hydrogen and —NH₂, and wherein to the carbon atoms are attached hydrogen or radicals of the group consisting of the aforesaid —NHX groups, alkyl, phenyl, phenylene, hydroxy, alkoxy, mercapto, thioether and substituted amino groups. However, to the best of our knowledge and belief it was not known prior to our invention to prepare condensation products of aldehydes with diazine derivatives of the kind embraced by Formula I, which diazine derivatives are believed to be new chemical compounds. The diazine derivatives used in practicing the present invention are entirely different from, and are not the equivalent of, diazine derivatives of the kind embraced by Formula III. Aldehyde-reaction products of diazine derivatives embraced by Formula I likewise are different from, and are not the equivalent of, reaction products of an aldehyde with a diazine derivative of the kind embraced by Formula III.

In practicing our invention the initial condensation reaction may be carried out at normal or at elevated temperatures, at atmospheric, subatmospheric or superatmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence or absence of solvents or diluents, other natural or synthetic resinous bodies, or while admixed with other materials that also can react with the aldehydic reactant or with the diazine derivative, e. g., urea (NH₂CONH₂), thiourea, selenourea, iminourea (guanidine), substituted ureas, thioureas, selenoureas and iminoureas; e. g., aldehyde-reactable urea derivatives such as mentioned in D'Alelio Patent No. 2,285,418, issued June 9, 1942, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention, e. g., 2,4,6-triaminopyrimidine, etc.; aminotriazines, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the diazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 49–69), with particular reference to reactions involving a non-haloacylated urea, a halogenated acylated urea and an aliphatic aldehyde. For instance, we may form a partial condensation product of ingredients comprising (1) urea or melamine or urea and melamine, (2) a diazine derivative of the kind embraced by Formula I, for example bis-(4,6-diamino pyrimidyl-2 hydrazinocarbonyl), bis-(2,6-diamino pyrimidyl-4 hydrazinocarbonyl), bis-[2,6-di-(methylamino) pyrimidyl-4 hydrazinocarbonyl], a poly-(diamino pyrimidyl hydrazinocarbonyl)-substituted aliphatic hydrocarbon, more particularly a bis-(diamino pyrimidyl hydrazinocarbonyl) alkane such, for instance, as alpha,beta-bis-(4,6-diamino pyrimidyl-2 hydrazinocarbonyl) ethane, alpha,beta-bis-(2,6-amino pyrimidyl-4 hydrazinocarbonyl) ethane, etc., a poly-(diamino pyrimidyl hydrazinocarbonyl)-substituted aromatic hydrocarbon, e. g., a bis-(4,6-diaminopyrimidyl-2 hydrazinocarbonyl) benzene, a bis-(2,6-diamino pyrimidyl-4 hydrazinocarbonyl) benzene, etc., and (3) an aldehyde, including polymeric aldehydes, hydroxyaldehydes and aldehyde-addition products, for instance formaldehyde, para-formaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated plywood and other laminated articles, and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

|  | Parts |
|---|---|
| Bis - [2,6 - di - (methylamino) pyrimidyl-4 hydrazinocarbonyl] methane | 30.3 |
| Aqueous formaldehyde (approx. 37.1% HCHO) | 24.3 |
| Sodium hydroxide in 1.5 parts water | 0.03 |
| Chloroacetamide (monochloroacetamide) | 0.3 |

All of the above ingredients with the exception of the chloroacetamide were heated together under reflux at the boiling temperature of the mass for 15 minutes. The chloroacetamide was now added and heating under reflux was continued for an additional 3 minutes. The resulting resinous syrup, which had a pH of 6.6, was mixed with 18.2 parts of alpha cellulose in flock form and 0.2 part of a mold lubricant, specifically zinc stearate, to form a molding (moldable) composition. The wet molding compound was dried at 60° C. until sufficient moisture had been removed to provide a material that could be molded satisfactorily. A sample of the dried and ground molding composition was molded for 3 minutes at 135° C. under a pressure of 2,000 pounds per square inch. The molded piece was well cured throughout, had excellent water resistance and marked resistance to blistering when placed in contact with a metal plate heated to a temperature of the order of 150° to 175° C. The molding compound showed good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha,beta-dibromopropionitrile, ethylene diamine hydrochloride, aminoacetamide hydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of use, for instance in D'Alelio copending applications Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

*Example 2*

|  | Parts |
|---|---|
| Bis - [2,6 - di - (methylamino) pyrimidyl-4 hydrazinocarbonyl] methane | 12.1 |
| Urea | 7.2 |
| Aqueous formaldehyde (approx. 37.1% HCHO) | 48.6 |
| Sodium hydroxide in 1.5 parts water | 0.03 |
| Chloroacetamide | 0.3 |

All of the above ingredients with the exception of the choloroacetamide were heated together under reflux at boiling temperature for 15 minutes. The chloroacetamide was added at the end of this reaction period and heating under reflux at boiling temperature was continued until a gel had formed in the reaction vessel. This gel was dried at 60° C. until sufficient moisture had been removed to provide a material that could be molded satisfactorily. A sample of the dried and ground resin was molded for 3 minutes at 135° C. under a pressure of 2,000 pounds per square inch. The unfilled molded piece exhibited excellent cure and cohesive properties and showed marked resistance to water and heat. The plasticity of the thermosetting resin during molding was very good.

*Example 3*

|  | Parts |
|---|---|
| Bis-[2,6 - di - (methylamino) pyrimidyl - 4 hydrazinocarbonyl] methane | 30.3 |
| Para-amino benzene sulfonamide | 12.9 |
| Aqueous formaldehyde (approx. 37.1% HCHO) | 48.6 |
| Sodium hydroxide in 2 parts water | 0.04 |
| Chloroacetamide | 0.4 |

All of the above components with the exception of the choloroacetamide were heated together under reflux at boiling temperature for 15 minutes, after which the above-stated amount of chloroacetamide was added and refluxing was continued for an additional 2 minutes. The resinous syrup produced in this manner had a pH of 9.61. It was mixed with 30.7 parts alpha cellulose and 0.2 part zinc stearate to form a molding compound. The wet molding composition was dried at 60° C. as described under Example 1. A well-cured molded piece having excellent cohesive characteristics and marked resistance to heat and water was obtained by molding a sample of the dried and ground molding compound for 3 minutes at 135° C. under a pressure of 2,000 pounds per square inch. The molding composition showed satisfactory plastic flow during molding.

*Example 4*

| | Parts |
|---|---|
| Bis - [2,6 - di - (methylamino) pyrimidyl-4 hydrazinocarbonyl] methane | 30.3 |
| Dimethylol urea (commercial grade, containing approx. 11% by weight of water) | 40.4 |
| Sodium hydroxide in 2 parts water | 0.04 |
| Chloroacetamide | 0.4 |
| Water | 100.0 |

All of the above ingredients with the exception of the chloroacetamide were heated together under reflux at the boiling temperature of the mass for 20 minutes. At the end of this reaction period the above-stated amount of chloroacetamide was added and refluxing was continued for an additional 3 minutes. The resulting resinous syrup, which had a pH of 7.77, was mixed with 23.7 parts alpha cellulose and 0.2 part zinc stearate to form a molding compound. The wet molding composition was dried at 60° C. as described under Example 1. A sample of the dried and ground molding compound was molded for 3 minutes at 135° C. under a pressure of 2,000 pounds per square inch. The molded piece was well cured throughout and had a well-knit and homogeneous structure. It also had very good heat resistance. Good flow characteristics of the molding compound during molding were indicated by the amount of flash on the molded piece.

The dimethylol urea in the above formula may be replaced in whole or in part by an equivalent amount of other aldehyde-addition products, for instance by a methylol aminotriazine, e. g., trimethylol melamine, hexamethylol melamine, etc.

*Example 5*

| | Parts |
|---|---|
| Bis-[2,6-di-(methylamino) pyrimidyl-4 hydrazinocarbonyl] methane | 30.3 |
| Acrolein | 16.3 |
| Sodium hydroxide in 1.5 parts water | 0.03 |
| Water | 100.0 | were heated together under reflux at the boiling temperature of the mass for 15 minutes, at the end of which reaction period a resin had precipitated from the solution. This resin cured to an insoluble and infusible state when a small sample of it was heated on a 140° C. hot plate in the absence of a curing agent. The curing of the resin under heat to an insoluble and infusible state is accelerated by incorporating therein a small amount of chloroacetamide, glycine, chloral urea, sulfamic acid or other curing agent such as mentioned under Example 1.

*Example 6*

| | Parts |
|---|---|
| Bis-[2,6-di-(methylamino) pyrimidyl-4 hydrazinocarbonyl] methane | 30.3 |
| Butyl alcohol | 27.9 |
| Aqueous formaldehyde (approx. 37.1% HCHO) | 24.3 | were heated together under reflux at the boiling temperature of the mass for 16 minutes, yielding a clear, resinous syrup which thereafter was dehydrated by heating it on a steam plate. The dehydrated syrup was soluble in ethylene glycol but was insoluble in water, ethyl alcohol, benzene and Solvatone. When a sample of the dehydrated syrup was heated on a 140° C. hot plate, it cured slowly to an insoluble and infusible state in the absence of a curing agent. More rapidly curing syrups are produced by incorporating, either into the initial syrupy condensation product or into the dehydrated syrup, monochloroacetamide, trichloroacetamide, sodium chloroacetate, ethanolamine hydrochlorides, glycine, citric acid, sulfamic acid or other curing agent such as mentioned under Example 1. The resinous material of this example may be employed in the preparation of various coating and impregnating compositions. It may be used as a modifier of varnishes of the aminoplast and alkyd-resin types.

*Example 7*

| | Parts |
|---|---|
| Bis-[2,6-di-(methylamino) pyrimidyl - 4 hydrazinocarbonyl] methane | 30.3 |
| Acetamide | 4.4 |
| Aqueous formaldehyde (approx. 37.1% HCHO) | 48.6 |
| Sodium hydroxide in 2 parts water | 0.04 | were heated together under reflux at the boiling temperature of the mass for 16 minutes, yielding a clear, syrupy condensation product. This resinous syrup was potentially heat-curable as shown by the fact that when monochloroacetamide, trichloroacetamide or citric acid was incorporated into samples of the syrup, the individual sample cured to an insoluble and infusible state upon heating on a 140° C. hot plate. Instead of the curing agents just named, other curing agents such as mentioned under Example 1 may be incorporated into the syrup to facilitate its conversion under heat to an insoluble and infusible state. For example, when a small amount of an acid, specifically hydrochloric acid, was added to the syrup and the acid-modified syrup then was applied to a glass plate, a hard, transparent, glossy, smooth and highly water-resistant, cured film was formed by baking the coated plate for several hours at 60° C. The resinous material of this example may be used in the preparation of baking varnishes or other coating and impregnating compositions. It also may be used as a modifier of other aminoplasts and compatible synthetic resins.

*Example 8*

| | Parts |
|---|---|
| Bis-[2,6-di-(methylamino) pyrimidyl - 4 hydrazinocarbonyl] methane | 30.3 |
| Diethyl malonate | 12.0 |
| Aqueous formaldehyde (approx. 37.1% HCHO) | 48.6 |
| Sodium hydroxide in 2 parts water | 0.04 | were heated together under reflux at the boiling temperature of the mass for 15 minutes, yielding a resinous syrup having curing characteristics much the same as the syrupy condensation product of Example 7. The dehydrated syrup was soluble in water, ethyl alcohol and ethylene glycol but was insoluble in benzene and Solvatone. A sample of the dehydrated syrup was acidified with a small amount of hydrochloric acid, after which a glass plate was coated with a sample of the acidified syrup. The coated plate was baked for several hours at 60° C. The baked film was hard, transparent, smooth and water-resistant. The resinous material of this example may be used in the preparation of coating and impregnating compositions, in the production of molding compounds, as a modifier of other synthetic resins, as a laminating varnish and for numerous other purposes.

*Example 9*

| | Parts |
|---|---|
| Bis-[2,6-di-(methylamino) pyrimidyl-4 hydrazinocarbonyl] methane | 30.3 |
| Glycerine | 6.9 |
| Aqueous formaldehyde (approx. 37.1% HCHO) | 48.6 |
| Sodium hydroxide in 2 parts water | 0.04 | were heated together under reflux at the boiling temperature of the mass for 15 minutes. The resulting resinous syrup was potentially heat-curable as shown by the face that when phenacyl chloride, chloroacetamide, sodium chloroacetate or other curing agent such as mentioned under Example 1 was incorporated into the syrupy condensation product, followed by heating on a 140° C. hot plate, the syrup cured rapidly to an insoluble and infusible state. A glass plate was coated with a sample of the dehydrated syrup into which had been incorporated a small amount of a curing agent, specifically hydrochloric acid. The coated plate was baked for several hours at 60° C. A hard, flexible, transparent, glossy, smooth and very water-resistant, baked film was formed on the plate. The resinous material of this example is especially suitable for use in the preparation of baking varnishes and other coating and impregnating compositions.

*Example 10*

A liquid, phenol-formaldehyde partial condensation product was prepared by heating together a mixture of the following components for 4 hours at 65° C.:

| | Parts |
|---|---|
| Synthetic phenol | 90.0 |
| Aqueous formaldehyde (approx. 37.1% HCHO) | 195.0 |
| Potassium carbonate | 2.85 |

The syrupy reaction product thereby obtained is identified in the following formula as "syrupy phenolic resin":

| | Parts |
|---|---|
| Syrupy phenolic resin | 108.9 |
| Bis-[2,6-di-methylamino) pyrimidyl-4 hydrazinocarbonyl] methane | 3.63 |
| Sodium hydroxide in a small amount of water | 0.01 |

These ingredients were heated together under reflux at the boiling temperature of the mass for 40 minutes. When a sample of the resulting resinous syrup was heated on a 140° C. hot plate, it cured slowly to an infusible mass in the absence of a curing agent. The addition of phthalic acid, citric acid, oxalic acid or other acidic material to the syrupy condensation product accelerated its conversion to an insoluble and infusible state under heat. The resinous material of this example may be used in the production of molding compounds or it may be employed in the preparation of various coating and impregnating compositions.

*Example 11*

| | Parts |
|---|---|
| Bis-[2,6-di-(methylamino) pyrimidyl-4 hydrazinocarbonyl] | 39.0 |
| Aqueous formaldehyde (approx. 37.1% HCHO) | 32.4 |
| Sodium hydroxide in 1.7 parts water | 0.035 |
| Chloroacetamide | 0.35 |

All of the above ingredients with the exception of the chloroacetamide were heated together under reflux at the boiling temperature of the mass for 16 minutes, at the end of which period of time the chloroacetamide was added and heating under reflux at boiling temperature was continued for an additional 5 minutes. The resulting resinous syrup was mixed with 20.5 parts alpha cellulose and 0.2 part zinc stearate to form a molding compound. The wet molding composition was dried at room temperature until sufficient moisture had been removed to provide a material that could be molded satisfactorily. A sample of the dried and ground molding compound was molded for 3 minutes at 135° C. under a pressure of 2,000 pounds per square inch. The molded piece was well cured throughout and had a well-knit and homogeneous structure. It had very good water resistance as evidenced by the fact that it absorbed only 2.3% by weight of water when immersed in boiling water for 15 minutes, followed by immersion in cold water for 5 minutes. (When similarly tested for water resistance, molded articles made from molding compounds containing the ordinary urea-formaldehyde resins usually absorb about 5 to 7% by weight of water.) Satisfactory plastic flow of the molding compound during molding was indicated by the amount of flash on the molded piece.

*Example 12*

| | Parts |
|---|---|
| Bis-[2,6-di-(methylamino) pyrimidyl-4 hydrazinocarbonyl] | 11.7 |
| Urea | 7.2 |
| Aqueous formaldehyde (approx. 37.1% HCHO) | 48.6 |
| Sodium hydroxide in 1.7 parts water | 0.035 |
| Chloroacetamide | 0.35 |

All of the above ingredients with the exception of the chloroacetamide were heated together under reflux at boiling temperature for 10 minutes, after which the chloroacetamide was added and refluxing was continued for an additional 5 minutes. A molding compound was prepared from the resulting resinous syrup, which had a pH of 7.95, by mixing therewith 19.8 parts alpha cellulose and 0.2 part zinc stearate. The wet molding composition was dried as described under Example 11. An excellently cured molded piece having good water resistance and good cohesive characteristics was produced by molding a sample of the dried and ground molding compound for 3 minutes at 135° C. under a pressure of 2,000 pounds per square inch. The plasticity of the molding compound during molding was satisfactory.

Example 13

| | Parts |
|---|---|
| Bis-[2,6-di-(methylamino) pyrimidyl-4 hydrazinocarbonyl] | 29.3 |
| Para-amino benzene sulfonamide | 12.9 |
| Aqueous formaldehyde (approx. 37.1% HCHO) | 48.6 |
| Sodium hydroxide in 2 parts water | 0.04 |
| Chloroacetamide | 0.4 |

A resinous syrup was prepared by heating together all of the above components with the exception of the chloroacetamide for 7 minutes at boiling temperature under reflux, after which the chloroacetamide was added and heating under reflux at boiling temperature was continued for an additional 3 minutes. A molding compound was produced by compounding this syrup, which had a pH of 10.05, with 27 parts alpha cellulose and 0.2 part zinc stearate. The wet molding composition was dried and molded as described under Example 11. The molded article was well cured throughout, had a well-knit and homogeneous structure, exceptionally good water resistance and a high degree of resiliency. The plasticity of the molding compound during molding was very good. The molding composition of this example would be especially suitable for use in the production of screw caps and other molded articles that are to be ejected hot from the mold.

Example 14

| | Parts |
|---|---|
| Bis-[2,6-di-(methylamino) pyrimidyl-4 hydrazinocarbonyl] | 29.3 |
| Dimethylol urea (commercial grade, containing approx. 11% by weight of water) | 40.4 |
| Sodium hydroxide in 1.5 parts water | 0.03 |
| Chloroacetamide | 0.3 |
| Water | 100.0 |

All of the above ingredients with the exception of the chloroacetamide were heated together under reflux at the boiling temperature of the mass for 15 minutes. The chloroacetamide was now added and heating under reflux at boiling temperature was continued for an additional 4 minutes. The resulting resinous syrup had a pH of 8.01. It was mixed with 20 parts alpha cellulose and 0.2 part zinc stearate to form a molding compound. The wet molding composition was dried first at room temperature and then at 60° C. until sufficient moisture had been removed to provide a material that could be molded satisfactorily. An excellently cured molded piece having good cohesive characteristics, a marked degree of resiliency and good water resistance was produced by molding a sample of the dried and ground molding compound for 3 minutes at 135° C. under a pressure of 2,000 pounds per square inch. Satisfactory plastic flow during molding was indicated by the amount of flash on the molded piece and by its homogeneity and evenness of structure.

The dimethylol urea in the above formula may be replaced in whole or in part by an equivalent amount of other aldehyde-addition products, for instance by a methylol aminotriazine, e. g., trimethylol melamine, hexamethylol melamine, etc.

Example 15

| | Parts |
|---|---|
| Bis-[2,6-di-(methylamino) pyrimidyl-4 hydrazinocarbonyl] | 39.0 |
| Acrolein | 22.4 |
| Aqueous ammonia (approx. 28% NH₃) | 3.9 |
| Sodium hydroxide in 1.5 parts water | 0.03 |
| Water | 20.0 | were mixed together, the acrolein being added last. An exothermic reaction took place immediately upon the addition of the acrolein and a resinous mass precipitated from the solution. This resin cured to an insoluble and infusible state in the absence of a curing agent when a small sample of it was heated on a 140° C. hot plate. The resinous material of this example may be used in the preparation of molding compounds.

Example 16

| | Parts |
|---|---|
| Bis-[2,6-di-(methylamino) pyrimidyl-4 hydrazinocarbonyl] | 39.0 |
| Butyl alcohol | 37.0 |
| Aqueous formaldehyde (approx. 37.1% HCHO) | 32.4 |
| Sodium hydroxide in 2.5 parts water | 0.05 | were heated together under reflux at the boiling temperature of the mass for 15 minutes. The resulting resinous syrup was dehydrated by heating it on a steam plate. The dehydrated syrup was soluble in ethylene glycol but was insoluble, or substantially so, in water, ethyl alcohol, benzene and Solvatone. When chloroacetamide, sulfamic acid or other curing agent such as mentioned under Example 1 was added to the initial syrupy condensation product or to the dehydrated syrup, followed by heating on a 140° C. hot plate, the material cured to an insoluble and infusible state. The product of this example may be used in the preparation of various liquid coating and impregnating compositions.

Example 17

| | Parts |
|---|---|
| Bis-[2,6-di-(methylamino) pyrimidyl-4 hydrazinocarbonyl] | 39.0 |
| Acetamide | 5.9 |
| Aqueous formaldehyde (approx. 37.1% HCHO) | 32.4 |
| Sodium hydroxide in 2 parts water | 0.04 | were heated together under reflux at the boiling temperature of the mass for 15 minutes. The resulting resinous syrup was potentially heat-curable as shown by the fact that when sulfamic acid, chloroacetamide or other curing agent such as mentioned under Example 1 was incorporated therein, followed by heating on a 140° C. hot plate, the resin cured to an insoluble and infusible state.

Example 18

| | Parts |
|---|---|
| Bis-[2,6-di-(methylamino) pyrimidyl-4 hydrazinocarbonyl] | 39.0 |
| Diethyl malonate | 16.0 |
| Aqueous formaldehyde (approx. 37.1% HCHO) | 32.4 |
| Sodium hydroxide in 2 parts water | 0.04 | were heated together under reflux at the boiling temperature of the mass for 6 minutes, at the end of which reaction period a resinous mass precipitated from the solution. This resin cured to an insoluble and infusible state in the absence of a curing agent when a small sample of it was heated on a 140° C. hot plate.

Example 19

| | Parts |
|---|---|
| Bis-[2,6-di-(methylamino) pyrimidyl-4 hydrazinocarbonyl] | 39.0 |
| Glycerine | 9.2 |
| Aqueous formaldehyde (approx. 37.1% HCHO) | 48.6 |
| Sodium hydroxide in 3 parts water | 0.06 | were heated together under reflux at the boiling temperature of the mass for 17 minutes. The resulting resinous syrup was dehydrated by heating it on a hot plate. The dehydrated syrup bodied to a thermoplastic resin upon being heated further on a 140° C. hot plate. When a small amount of phthalic anhydride or other curing agent such as mentioned under Example 1 was incorporated into the initial syrupy condensation product or into the dehydrated syrup, the material cured to an infusible resin upon being heated on a 140° C. hot plate. Glass plates were coated with samples of the dehydrated syrup, one of which contained a small amount of an acid, specifically hydrochloric acid, as a curing agent. The coated plates were baked for several hours at 60° C. In both cases the baked films were hard, glossy, transparent and wrinkled, and adhered tightly to the glass surface. The hydrochloric acid-modified syrup yielded a baked film that was more water resistant and less wrinkled than the film obtained from the unmodified syrup.

Example 20

| | Parts |
|---|---|
| Bis-[2,6-di-(methylamino) pyrimidyl-4 hydrazinocarbonyl] | 39.0 |
| Polyvinyl alcohol | 4.4 |
| Aqueous formaldehyde (approx. 37.1% HCHO) | 32.4 |
| Sodium hydroxide in 2 parts water | 0.04 | were heated together under reflux at the boiling temperature of the mass for 15 minutes. When a sample of the resulting resinous syrup was heated on a 140° C. hot plate, it bodied to a thermoplastic resin. However, when a small amount of an acid, specifically hydrochloric acid, was incorporated into a sample of the syrupy condensation product, the resulting material was converted into an infusible mass when the sample was heated on a 140° C. hot plate. When a glass plate coated with the unmodified syrup was heated for several hours at 60° C., an adhering, glossy, transparent, thermoplastic film was formed on the plate. Under the same heat treatment a glass plate that had been coated with a sample of the syrup into which had been incorporated a small amount of hydrochloric acid as a curing agent gave a baked film that was hard, transparent, flexible and glossy. Molding compositions or various liquid coating and impregnating compositions may be produced from the resinous material of this example.

Example 21

| | Parts |
|---|---|
| Bis-[2,6-di-(methylamino) pyrimidyl-4 hydrazinocarbonyl] methane | 30.3 |
| Aqueous formaldehyde (approx. 37.1% HCHO) | 48.6 |
| Sodium hydroxide in 2 parts water | 0.04 |
| Polyvinyl alcohol | 3.4 | were heated together under reflux at the boiling temperature of the mass for 15 minutes. The resulting resinous syrup was potentially heat-curable as evidenced by the fact that when a small amount of a curing agent, specifically hydrochloric acid, was incorporated into the syrupy reaction product, followed by heating on a 140° C. hot plate, the syrup was converted into an opaque, infusible resin. Glass plates were coated with samples of the resinous syrup, one of which was modified by the addition of a small amount of hydrochloric acid. The coated plates were baked for several hours at 60° C. The baked films, in both cases, were hard, transparent, glossy, smooth, flexible and water-resistant. The resinous material of this example, either with or without a curing agent such as mentioned under Example 1, may be used in the production of molding compositions or it may be employed in the preparation of various liquid coating and impregnating compositions. If thermosetting molding or coating compositions are desired, a suitable curing agent should be incorporated into the syrupy condensation product or into the molding or coating composition containing such condensation product.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperature than at elevated temperatures in accordance with the general law of chemical reactions. Thus, instead of effecting reaction between the ingredients of the foregoing examples under reflux at the boiling temperature of the mass as mentioned in all but one (Example 15) of the examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific diazine derivative embraced by Formula I that is named in the above illustrative examples. Thus, instead of bis-[2,6-di-(methylamino) pyrimidyl-4 hydrazinocarbonyl] and bis-[2,6-di-(methylamino) pyrimidyl-4 hydrazinocarbonyl] methane, we may use, for example, bis-[4,6-di-(methylamino) pyrimidyl-2 hydrazinocarbonyl], bis-[4,6-di-(methylamino) pyrimidyl-2 hydrazinocarbonyl] methane, bis-(2,6-diamino pyrimidyl-4 hydrazinocarbonyl), bis-[2,6-di-(propylamino) pyrimidyl-4 hydrazinocarbonyl], bis-(4,6-diamino pyrimidyl-2 hydrazinocarbonyl), bis-[4,6-di-(propylamino) pyrimidyl-2 hydrazinocarbonyl], bis-(2,6-diamino pyrimidyl-4 hydrazinocarbonyl) methane, other poly-(diamino pyrimidyl hydrazinocarbonyl) - substituted aliphatic hydrocarbons, more particularly bis-(diamino pyrimidyl hydrazinocarbonyl) alkanes such, for example, as alpha,beta-bis-(2,6-diamino pyrimidyl-4 hydrazinocarbonyl) ethane, alpha,beta-bis-(4,6-diamino pyrimidyl-2 hydrazinocarbonyl) ethane, etc., a poly-(diamino pyrimidyl hydrazinocarbonyl) - substituted aromatic hydrocarbon, e. g., a bis-(diamino pyrimidyl hydrazinocarbonyl) benzene, a bis-(diamino pyrimidyl hydrazinocarbonyl) toluene, etc., or any other diazine derivative of the kind embraced by Formula I, numerous examples of which have been given herein and in our copending application Serial No. 456,263.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes, (e. g., aldol, glucose, glycollic aldehyde, glyceraldehyde, etc.); mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, of the aminotriazoles, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending, for instance, upon the particular starting reactants employed and the particular properties desired in the finished product. Ordinarily these reactants are employed in an amount corresponding to at least one mol of the aldehyde, specifically formaldehyde, for each mol of the diazine derivative. Thus, we may use, for example, from 1 to 15 or 20 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 35 or 40 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, mono-hydric alcohols, e. g., methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides; e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristic, for example hydrolyzed wood products, formalized cellulose derivatives, lignin, protein-aldehyde condensation products, aminotriazine-aldehyde condensation products (e g., melamine-formaldehyde condensation products), aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind embraced by Formula I and an aldehyde, specifically formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, acetic, chloroacetic, propionic, butyric, valeric, acrylic, oxalic, malonic, methacrylic, polyacrylic, polymethacrylic, succinic, adipic, maleic, fumaric, benzoic, salicylic, phthalic, camphoric, etc.

Dyes, pigments, plasticizers, curing agents, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, wood veneer, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

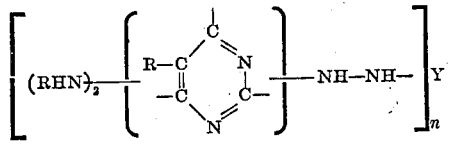

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

2. A composition of matter comprising the product of reaction of ingredients comprising formaldehyde and a compound corresponding to the general formula

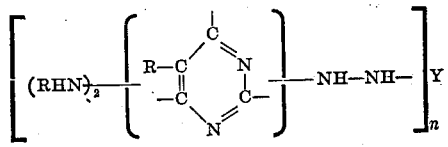

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

3. A composition of matter comprising the product of reaction of ingredients comprising an aldehyde and a compound corresponding to the general formula

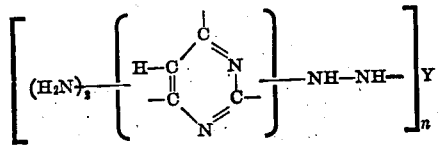

where Y represents a polyacyl radical of an unsubstituted aliphatic polycarboxylic acid and $n$ represents an integer having a value equal to the valency of the polyacyl radical of Y.

4. A composition of matter comprising the product of reaction of ingredients comprising an aldehyde and a compound corresponding to the general formula

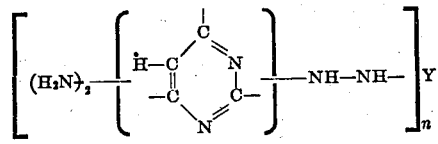

where Y represents a polyacyl radical of an unsubstituted aromatic polycarboxylic acid and $n$ represents an integer having a value equal to the valency of the polyacyl radical of Y.

5. A composition as in claim 1 wherein the reaction product is the product obtained by effecting initial reaction between the stated components under alkaline conditions.

6. A composition as in claim 1 wherein the reaction product is an alcohol-modified reaction product of the stated components.

7. A heat-curable resinous composition comprising the heat-convertible condensation product of ingredients comprising formaldehyde and a compound corresponding to the general formula

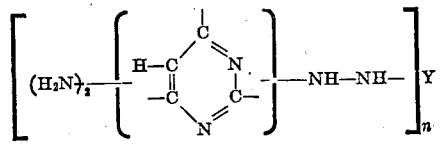

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

8. A product comprising the cured resinous composition of claim 7.

9. A composition of matter comprising the resinous condensation product of ingredients comprising an aldehyde and a bis-(diamino pyrimidyl hydrazinocarbonyl) alkane.

10. A composition of matter comprising the resinous condensation product of ingredients comprising an aldehyde and an alpha, beta-bis-(diamino pyrimidyl hydrazinocarbonyl) ethane.

11. A composition of matter comprising the resinous condensation product of ingredients comprising an aldehyde and a bis-[di-(methylamino) pyrimidyl hydrazinocarbonyl].

12. A resinous composition comprising the product of reaction of ingredients comprising formaldehyde and bis-[2,6-di-(methylamino) pyrimidyl-4 hydrazinocarbonyl].

13. A composition of matter comprising the resinous condensation product of ingredients comprising an aldehyde and a bis-(diamino pyrimidyl hydrazinocarbonyl) benzene.

14. A composition comprising the resinous product of reaction of ingredients comprising a urea, an aldehyde and a compound corresponding to the general formula

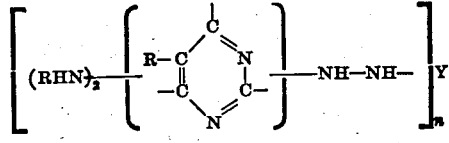

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

15. A composition comprising the resinous product of reaction of ingredients comprising urea, formaldehyde and a compound corresponding to the general formula

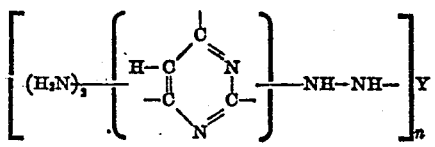

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

16. A composition comprising the resinous product of reaction of ingredients comprising dimethylol urea and a compound corresponding to the general formula

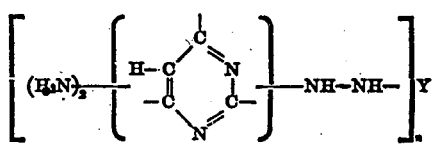

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

17. A composition comprising the resinous product of reaction of ingredients comprising an aminotriazine, an aldehyde and a compound corresponding to the general formula

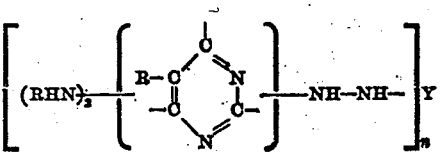

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

18. A composition comprising the resinous product of reaction of ingredients comprising melamine, formaldehyde and a compound corresponding to the general formula

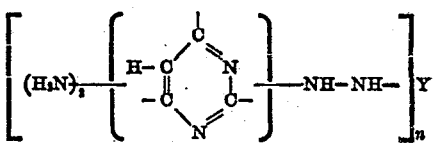

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

19. A heat-curable composition comprising the heat-convertible resinous reaction product of (1) a partial condensation product of ingredients comprising formaldehyde and a compound corresponding to the general formula

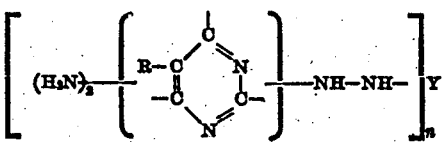

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y, and (2) a curing reactant.

20. The method of preparing new synthetic compositions which comprises effecting reaction between ingredients comprising an aldehyde and a compound corresponding to the general formula

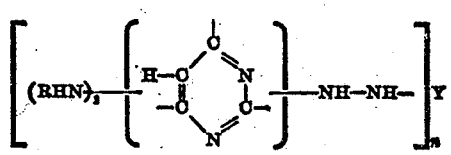

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

GAETANO F. D'ALELIO.
JAMES W. UNDERWOOD.

CERTIFICATE OF CORRECTION.

Patent No. 2,339,061. January 11, 1944.

GAETANO F. D'ALELIO, ET AL.

It is hereby certified that error appears in the printed specification of the above numbered patent requiring correction as follows: Page 1, second column, line 27-28, for "trimethyl" read --trimesyl--; page 2, first column, line 9, after "(methylamino" insert a closing parenthesis; line 10, after the bracket insert --methane--; page 4, first column, line 3, for "2,6-amino" read --2,6-diamino--; line 6, for "4,6-diaminopyrimidyl-2" read --4,6-diamino pyrimidyl-2--; and second column, line 34, for "use" read --us--; page 5, first column, line 2, for "choloroacetamide" read --chloroacetamide--; page 6, first column, line 29, for "face" read --fact--; line 64, before "methylamino)" insert an opening parenthesis; page 9, first column, line 14, after "hydroxyaldehydes" strike out the comma; line 47, for "correspondinrg" read --corresponding--; line 68, for "mono-hydric" read --monohydric--; and second column, line 15, for "characteristic" read --characteristics--; page 11, second column, line 43, for that portion of the formula reading "R-C" read --H-C--; line 68, for "H-C" read --R-C--; and that the said Letters Patent should be read with this correction therein that the same may conform to the record of the case in the Patent Office.

Signed and sealed this 18th day of April, A. D. 1944.

Leslie Frazer (Seal)                              Acting Commissioner of Patents.